(12) United States Patent
Griffith, Sr.

(10) Patent No.: US 6,638,122 B1
(45) Date of Patent: Oct. 28, 2003

(54) ELECTRIC MARINE PROPULSION EMPLOYING SWITCHED RELUCTANCE MOTOR DRIVE

(75) Inventor: Thomas E. Griffith, Sr., Florence, MS (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/540,375

(22) Filed: Mar. 31, 2000

(51) Int. Cl.[7] ................................................ B60L 11/02
(52) U.S. Cl. ........................................................ 440/6
(58) Field of Search ............................ 440/6, 7, 83, 111, 440/112

(56) References Cited

U.S. PATENT DOCUMENTS

| | | | | |
|---|---|---|---|---|
| 486,684 A | * | 11/1892 | Salisbury | 440/83 |
| 2,824,984 A | * | 2/1958 | Harris | 440/6 |
| 3,987,748 A | * | 10/1976 | Carroll | 440/11 |
| 4,698,537 A | * | 10/1987 | Byrne et al. | 310/168 |
| 5,057,726 A | * | 10/1991 | Mole et al. | 310/67 R |
| 5,111,095 A | * | 5/1992 | Hendershot | 310/168 |
| 5,586,613 A | * | 12/1996 | Ehsani | 180/65.2 |
| 5,827,095 A | * | 10/1998 | Mantere | 440/6 |
| 5,947,779 A | * | 9/1999 | Heideman et al. | 440/6 |
| 5,954,551 A | * | 9/1999 | King | 440/7 |
| 6,056,518 A | * | 5/2000 | Allen et al. | 417/355 |

* cited by examiner

*Primary Examiner*—Ed Swinehart
(74) *Attorney, Agent, or Firm*—Ziolkowski Patent Solutions Group, LLC

(57) ABSTRACT

A propulsion unit for a watercraft including a prop which is adapted for producing thrust when rotated, and an electric motor drivingly coupled to the prop. The electric motor is of the switched reluctance type which includes a stator, formed of a plurality of windings, and a rotor having a plurality of poles about the circumference of the rotor. The stator windings are divided into a plurality of phases which are sequentially energized by electric current. A controller is coupled to the electric motor to determine the order and timing of phase energization. Proper sequencing of the phase energization creates a dynamic magnetic field inducing the rotor to rotate accordingly.

24 Claims, 4 Drawing Sheets

ELECTRIC MARINE PROPULSION EMPLOYING SWITCHED RELUCTANCE MOTOR DRIVE

BACKGROUND OF THE INVENTION

1. Field of the Invention

The present invention relates generally to electric propulsion units for recreational watercraft. More specifically the present invention relates to propulsion units which employ brushless DC motors and more particularly the utilization of switched reluctance motors in such propulsion units.

2. Description of the Related Art

Recreational watercraft are extremely popular for a variety of uses. Some of the more typical uses may include water skiing, other suitable towing activities, fishing, and pleasure riding, just to name a few. All of these activities typically require the ability of a propulsion system to move the watercraft through the water by providing an adequate amount of thrust.

Many watercraft rely on an outboard, or inboard/outboard motor as a primary propulsion device. Such motors generally include an internal combustion engine to supply the required thrust. In watercraft outfitted for fishing purposes, a secondary propulsion system is often employed by the watercraft. These secondary propulsion systems are commonly known as trolling motors or electric outboards. Trolling motors are typically light weight electric motors drivingly coupled to a prop for propelling a fishing boat. Because of the relatively small size and quiet operation of such motors, they are often used to propel the boat into remote and shallow regions of a body of water. The motors may be operated and controlled without diverting the user from fishing in many instances. Such propulsion systems are often connected to an operator input device, such as a foot pedal. The operator will utilize the foot pedal to control the thrust and direction of the trolling motor. Depending upon the design, the electric motor may be directly adjacent to the prop, and thus submersed in the body of water. In other designs, the electric motor may be coupled to the prop by a shaft or other driving component, allowing the electric motor to remain out of the water during operation.

The electric motors used for such service today are typically brush-type or commutated DC motors. In one such design, the motor has magnets located around the inner periphery of the motor housing. A rotating member, known as the armature, is located in the interior of the housing and concentric with the magnets. The armature is composed of loops or windings of wire connected to wedge shaped segments known as commutator bars. Contact components or brushes, typically made of copper and carbon, contact the commutator bars to conduct electrical energy to the rotor windings. As current flows through the windings, a magnetic field is generated which interacts with that of the magnets surrounding the armature. The magnetic field created by the armature is either attracted or repelled by the surrounding magnets and thus induces a rotation of the armature. As the armature rotates, the attached commutator bars rotate with it, while the brushes remain stationary. As a result of the armature rotation, the brushes contact new commutator bars, electrical energy is applied to the successive set of windings, and the process of driving the armature in a given rotational direction continues.

Propulsion systems such as those described above, utilizing brush-type DC motors, have well served their intended use, but they are not without the possibility for improvement. For example, commutated motors require frictional contact between the commutator and brushes, resulting in mechanical and electrical noise. The inevitable wear of the brushes produces particulates which are detrimental to the motor's performance, such as contamination and degradation of the bearings. Furthermore, because the electrical windings are located away from the housing, and because the majority of heat is generated by the windings, heat transfer is inefficient. Heat must travel through an air gap, through the magnets, and then through the housing to be dissipated. All of these factors lead to inefficiencies and/or shortening of the useful life of the motor.

Certain systems have been proposed that employ various types of brushless DC motors for such drives. However, these systems too have suffered from relatively low efficiencies, resulting in high energy consumption, excessive heating, and the need to oversize the motors to obtain the desired output thrust.

There is, therefore, a need in the art for a watercraft propulsion system which reduces the drawbacks of commutated DC motors, such as frictional contact within the electric motor, particulate production within the electric motor, and so forth. There is also a need for trolling motors and electric outboards which are more efficient, run cooler, and offer a smaller and lighter-weight overall package.

SUMMARY OF THE INVENTION

The invention provides a propulsion system designed to respond to these needs. In accordance with one aspect of the invention a propulsion unit for a watercraft is provided that includes a prop adapted for producing thrust in forward or reverse directions when rotated about a central axis. An electric motor is drivingly coupled to the prop. The electric motor is of the switched reluctance type which includes a stator, formed of a plurality of windings, and a rotor having a plurality of poles about the circumference of the rotor. The stator windings are divided into a plurality of phases which are energized by electric current during operation. A controller may be coupled to the electric motor to apply drive signals in accordance with the desired order and timing of phase energization. This control is then configured to respond to the torque, speed or direction requirements imposed on the motor by the watercraft.

In accordance with another aspect of the invention, a method is provided for propulsion of a watercraft. In the method, a prop is adapted for displacing water upon rotation of the prop about an axial centerline. The prop is drivingly coupled to an electric motor which has a stator and a rotor. The stator is divided into a plurality of phases and the rotor is provided with a plurality of poles about its circumference. A first phase of the stator is then energized with an electrical current. The first phase is then de-energized by withdrawing the electrical current. Upon de-energization of the first phase, a subsequent phase, adjacent to the first phase, is energized. The process of energization and de-energization continues, creating a dynamic magnetic field which has a pattern of rotation in a first direction (e.g. clockwise). The rotor is adapted to have the poles arranged such that the rotor rotates in response to the dynamic magnetic field.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
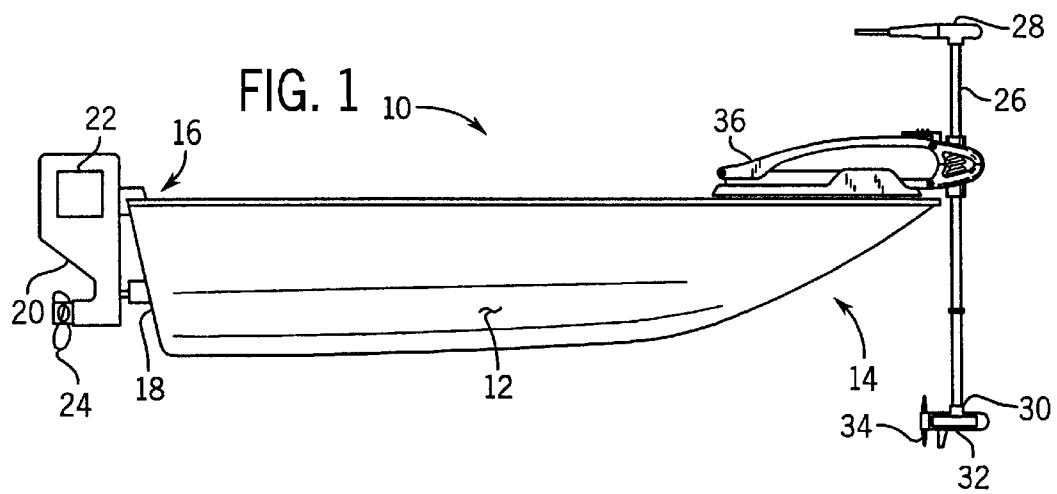
FIG. 1 is an elevational side view of a watercraft employing a propulsion system in accordance with certain aspects of the invention.

Turning now to the drawings and referring first to FIG. 1, a watercraft 10 is shown. The watercraft 10 includes a hull 12 which has a bow section 14 and a stern section 16. The stem section includes a transom 18. Mounted to the transom 18 is a primary propulsion unit 20 shown here as an outboard motor. The primary propulsion system includes an internal combustion engine 22, which is drivingly coupled to a prop 24. The prop 24 is driven by the internal combustion engine 22 such that the prop 24 produces a thrust when rotated below the waterline of the craft. It is noted that the primary propulsion system 20 need not comprise an outboard motor. Rather, it is contemplated that other primary propulsion systems may be used such as an inboard or inboard/outboard configuration. Such a configuration typically places the internal combustion engine inside the hull 12 of the watercraft 10 rather than on the exterior of the transom 18.

At the bow 14 of the watercraft 10 is a secondary propulsion system or trolling motor 26. The secondary propulsion system 26 includes a control head 28 and a propulsion unit 30. The control head 28 houses electrical components and circuitry, and may include a directional control mechanism for changing the direction or angular orientation of the propulsion unit 30 with respect to the watercraft 10. The propulsion unit includes an electric motor 32 and a prop 34 drivingly coupled to the electric motor 32. The electric motor 32 is a switched reluctance motor, the operation and configuration of which will described in greater detail below. The electrical components and circuitry housed in the control head 28 are electrically coupled to the electric motor 32 to provide control signals and electrical energy to the electric motor 32. In the embodiment of FIG. 1, the secondary propulsion unit 26 is shown to be mounted on the deck or gunwale of the watercraft 10.

It is noted that the secondary propulsion unit 26, as shown in FIG. 1, places the electric motor 32 in a location which requires it to be submersed during operation. As will be appreciated by those skilled in the art, such deployment requires that the motor be placed in a proper housing which is adequately sealed to prevent water from entering into the electric motor 32. Such housing and seal designs are well understood by those of ordinary skill in the art and are not discussed in detail herein. However, it is contemplated that the electric motor could be located in such a way that submersion of the electric motor would not be required. For example, the motor 32 could be placed in the control head 28 or elsewhere (i.e., above the water or within the boat hull), instead of adjacent to the prop 34. In such an alternative embodiment, the electric motor 32 could be drivingly coupled to the prop by way of shafts and gears for proper transmission of mechanical power to the prop 34.

Figure 2:
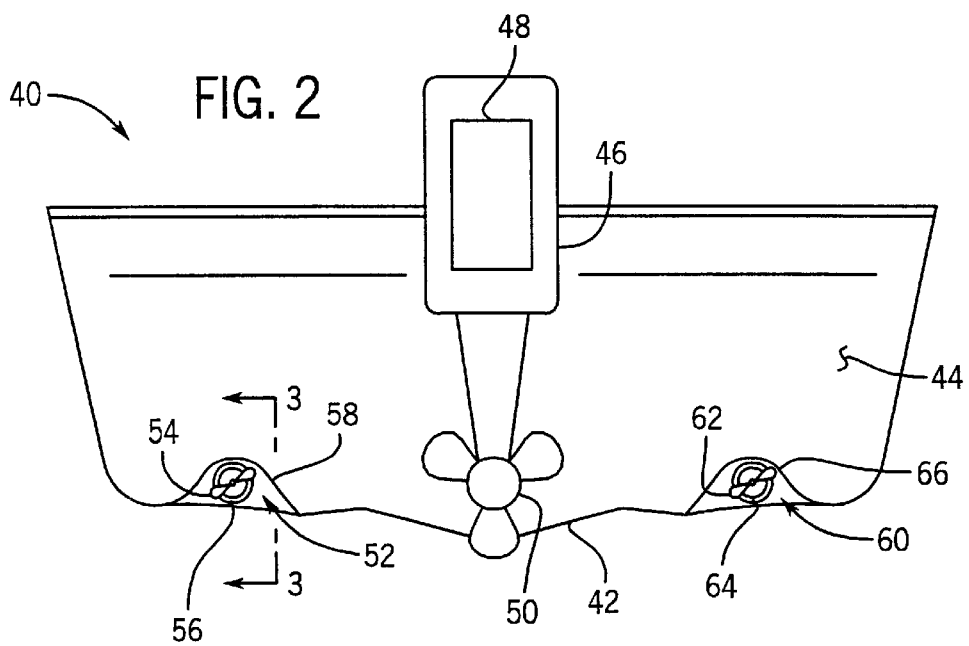
FIG. 2 is an elevational rear view of another watercraft employing a differently configured propulsion system, also in accordance with aspects of the invention.

Turning now to FIG. 2, an alternative embodiment is shown, from the point of view of the stern section. The watercraft 40 of this embodiment includes a hull 42 and has transom 44 to which a primary propulsion system 46 is mounted. The primary propulsion system, similar to that described above, includes an internal combustion engine 48 which is drivingly coupled to a prop 50. The primary propulsion system 46, shown here as an outboard motor, produces thrust to drive the watercraft 40 through a body of water. A secondary propulsion system is also provided in this embodiment. The secondary propulsion system includes dual propulsion units 52 and 60. Each propulsion unit 52 and 60 includes a prop 54 and 62, and a switched reluctance electric motor 56 and 64, respectively. Each propulsion unit 52 and 60 is mounted within a small recess, 58 and 66 respectively, on the underside of the hull.

Figure 3A:
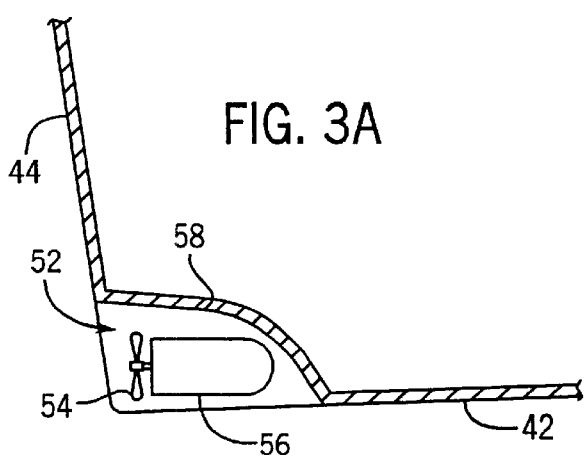
FIG. 3A is a simplified partial sectional view of the embodiment of FIG. 2, along section line 3—3.
Figure 3B:
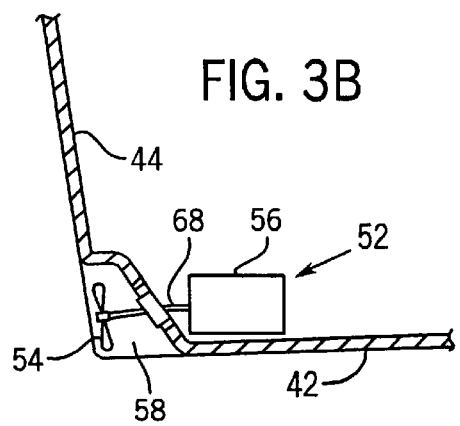
FIG. 3B is a simplified partial sectional view of a variation on the embodiment of FIG. 2, also along section line 3—3.

FIGS. 3A and 3B show a partial sectional view of one of the secondary propulsion units 52 according to two exemplary embodiments of the system shown in FIG. 2, simplified somewhat for explanatory purposes (e.g. with wiring, mounting and sealing structures not shown in detail). FIG. 3A shows the propulsion unit 52 to have the prop 54 and motor 56 adjacent to each other, with both being mounted in the recess 58 on the exterior of the watercraft hull 42. In such a configuration, the motor is submersed during all times that the watercraft is in use (i.e., floated), whether or not the secondary propulsion system is being operated. In the alternative embodiment of FIG. 3B, the propulsion unit 52 places the prop 54 alone in the recess 58 while allowing the motor 56 to be mounted within the interior of the hull 42. This configuration allows for a smaller recess 58 and more flexibility in mounting the motor 56. A flexible or rigid shaft 68 couples the electric motor 56 to the prop 54 to drive the prop, and thus to produce the required thrust for the watercraft 40. The shaft 68 may be rigid, while the use of a flexible shaft may allow for greater design freedom in configuring the hull 42 and the recess 58, as well flexibility in positioning the electric motor 56 in relation to the prop 54.

In the embodiment shown in FIG. 2, regardless of whether the arrangement of FIG. 3A or 3B is used, the props 54 and 62 are mounted in a fixed directional manner. Thus, while the props 54 and 62 may rotate about an axial centerline to produce the required thrust, the axial centerline is fixed with respect to the hull 42 (except by mechanical adjustment such as by disassembly and repositioning of the unit). With both propulsion units 52 and 60 directionally fixed, the watercraft 40 is steered by varying the relative speed and/or rotational direction of each prop 54 and 62. For example, to go for "straight ahead" navigation, both propulsion units would rotate at the same or nearly the same speed and in the same direction. To turn the watercraft to the left, or port side, the port side propulsion unit 52 would either rotate slower than the starboard side propulsion unit 60, or it could rotate in reverse direction while the starboard side propulsion unit 60 maintains a forward thrust. Alternatively, one unit may be driven while the other remains stationary. Thus, the propulsion units 52 and 60 would not require independent directional mechanisms for proper navigation of the watercraft 40.

Figure 4:
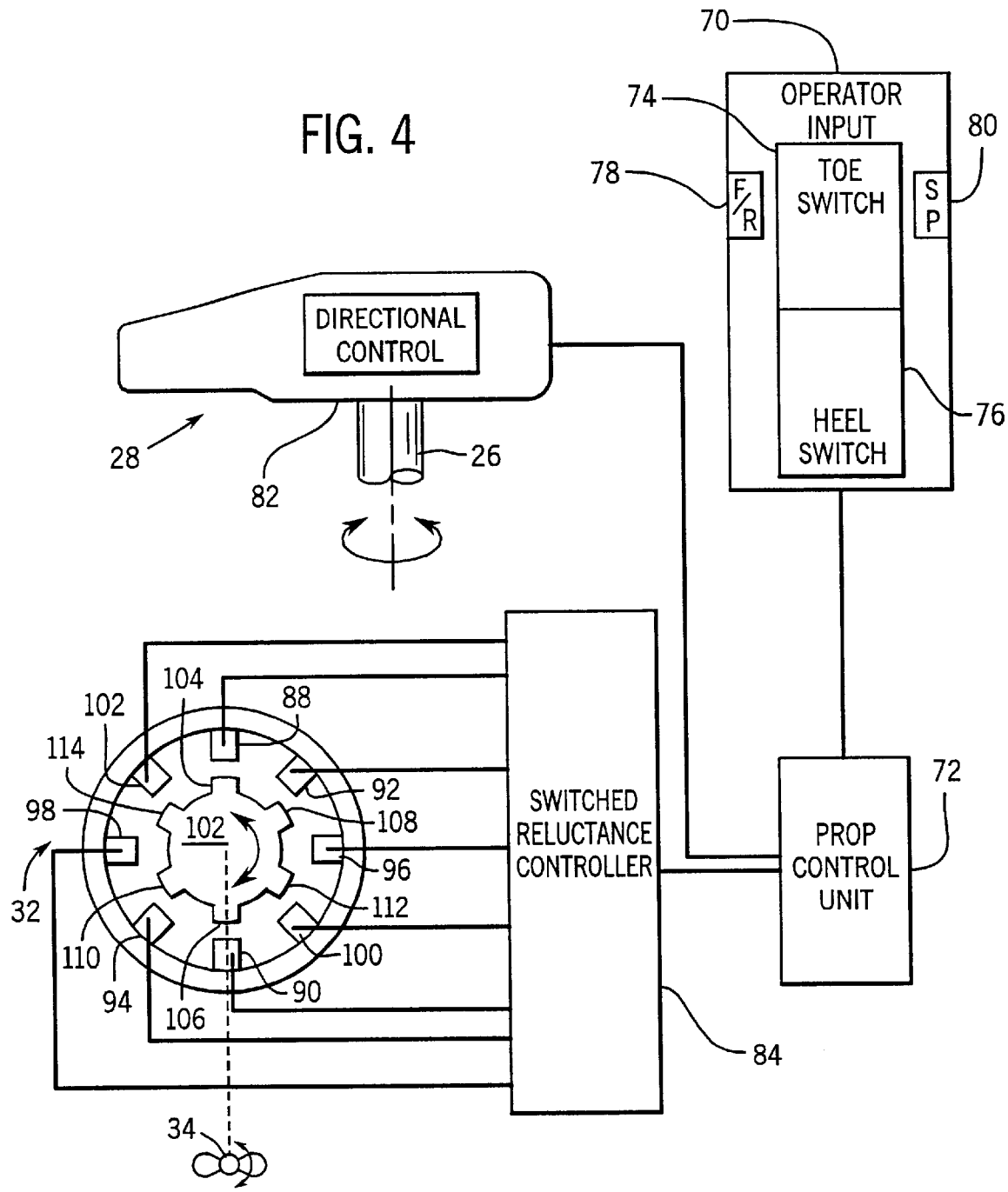
FIG. 4 is a schematic diagram illustrating the operation of the embodiment shown in FIG. 1.
Figure 5:
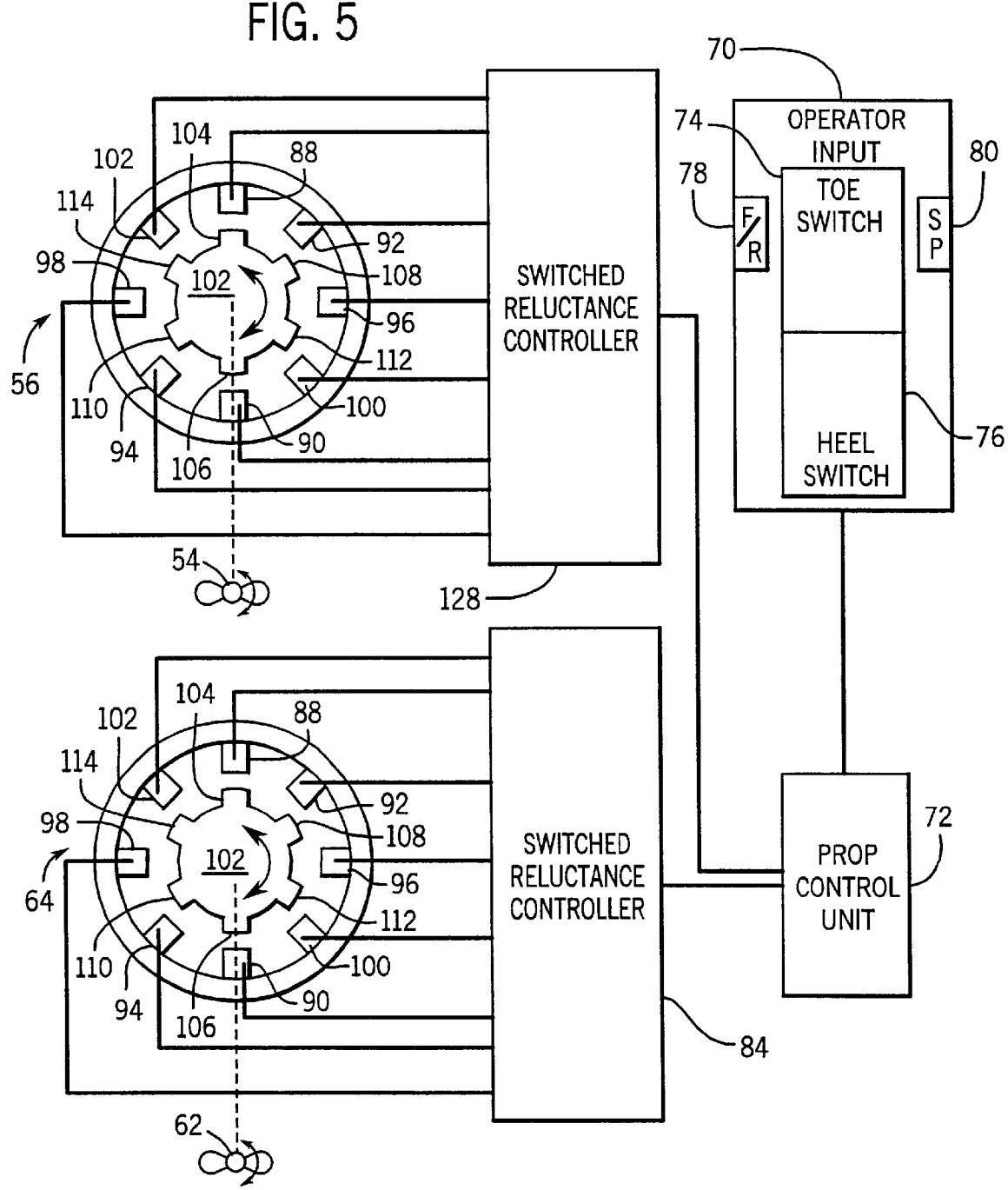
FIG. 5 is a schematic diagram illustrating the operation of the embodiment shown in FIG. 2.
Figure 6:
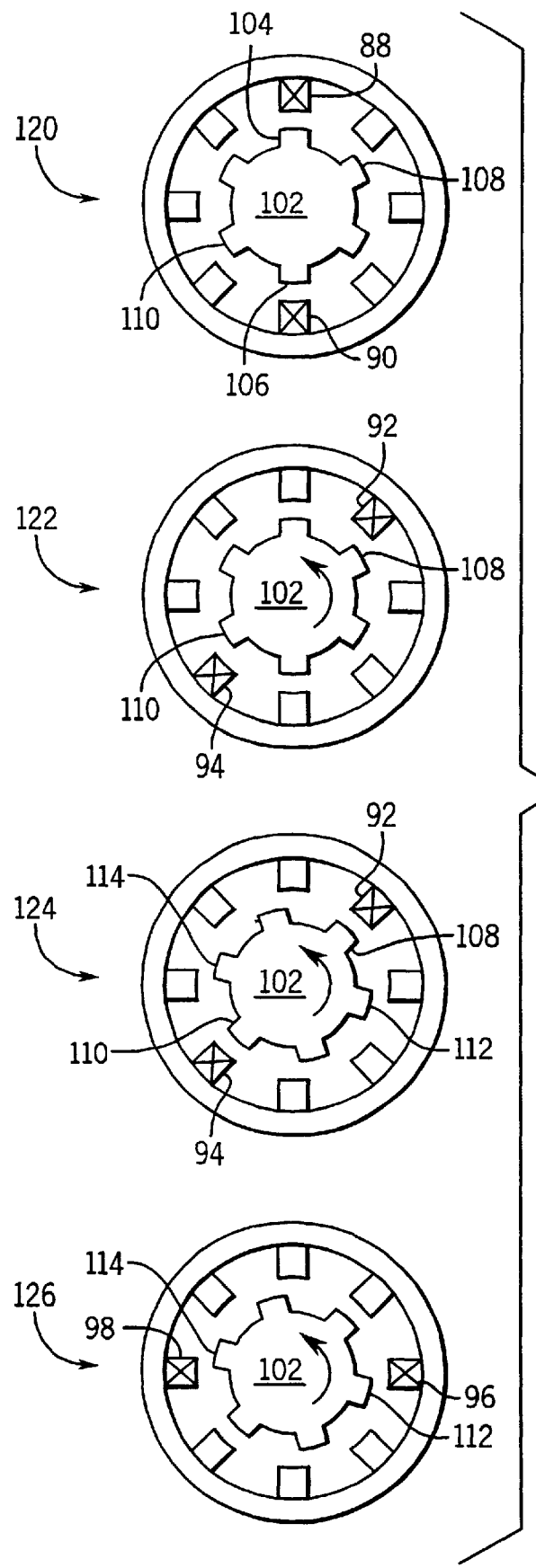
FIG. 6 is sequence of sectional views of the switched reluctance electric motor of the previous figures, illustrating the operation of the motor during successive switching cycles.

Turning now to FIGS. 4, 5 and 6, the structure and operation of the secondary propulsion systems will be explained with respect to the embodiments described above. Operation of the system shown in FIG. 1 will first be described with reference to FIGS. 4 and 6. FIG. 4 is a diagrammatical representation for the operation of the secondary propulsion system depicted in FIG. 1. An operator input device 70 is shown to be connected to a propulsion control unit 72. The operator input device 70 is depicted as a foot pedal which allows for numerous commands to be indicated by the operator by actuation of corresponding switches. For example, the operator might trigger (i.e. close) a first switch 74 to turn right, or to the starboard side. Triggering a second switch 76 with the operator's heel would then cause the watercraft to turn left, or to the port side. A third switch 78 might initiate forward or reverse thrust, while a fourth switch or potentiometer 80 sets a desired speed.

The propulsion control unit 72 which may be physically positioned within the input device housing, or remote from the housing, receives signals from the operator input device 70 and processes the command or request accordingly. If the signal received by the propulsion control unit 72 is a directional signal, i.e. turn left or turn right, then the propulsion control unit 72 will activate the steering device/directional control mechanism 82 to appropriately change the direction of the propulsion unit with respect to the watercraft. If the input is a command for forward or reverse thrust, the propulsion control unit will properly activate a switched reluctance controller or phase controller 84 coupled to the motor 32 (also shown in FIG. 1). The switched reluctance controller 84 may also be provided within the same housing as the propulsion control unit 72. Alternatively, the switched reluctance controller may be provided local to motor 32. That is, the switched reluctance controller may be provided either within the directional control mechanism 82 (i.e. within the control head 28 of the propulsion system), or within the propulsion unit 30 itself. The construction and operation of the directional control 82 may be generally similar to that of existing devices. In general, such devices may include a small electric motor coupled to a pinion which drives a driven gear for rotating the support tube of the propulsion unit.

Referring more particularly to the motor and propulsion unit, the motor 32 includes a stator which is represented by a series of windings 88, 90, 92, 94, 96, 98 and 100. The motor further includes a rotor 102 made of ferrous or ferromagnetic material. The rotor 102 has a plurality of poles 104, 106, 108, 110, 112 and 114 formed about its periphery. Upon receipt of signals from the propulsion control unit 72, the switched reluctance controller energizes a phase (i.e., a diametrically opposed pair of windings in the stator) to induce motion of the rotor.

Referring to the sequence diagram shown in FIG. 6, the effect of phase energization upon the rotor 102 is described. At a first stage of operation 120 a first pair of windings 88 and 90 are energized. In FIG. 6 energized windings are denoted by an 'X' placed in the winding. The passing of current through the pair of windings 88 and 90 creates a magnetic flux field between the two windings which induces a pair of poles 104 and 106 of the rotor to align themselves with the windings 88 and 90.

During a second stage or switching cycle 122, the first phase is de-energized, and a second pair of windings 92 and 94 are energized. The second pair of windings 92 and 94 are located adjacent the first pair of windings 88 and 90. Energization of windings 92 and 94 draws the closest pair of rotor poles 108 and 110, which are not directly aligned with the windings 92 and 94, toward the energized windings. Thus, the magnetic flux field causes the poles 108 and 110 to become attracted to the energized windings 92 and 94 such that motion is induced in the rotor 102. As a result, as shown in the third stage 124 of the sequence diagram, the second pair of windings 92 and 94 are still activated and the rotor 102 has rotated counterclockwise to allow the poles 108 and 110 to align with the energized phase. At stage four 126 of the sequence, the second set of windings 92 and 94 are de-energized and a third set of windings 96 and 98, adjacent to the second set of windings 92 and 94, are energized. When energization of the third set of windings 96 and 98 is initiated, the closest pair of poles, 112 and 114, respectively, are slightly out of alignment with the energized windings 96 and 98. The magnetic flux field created by the windings 96 and 98 again induces the rotor 102 to rotate counterclockwise to create the desired alignment of the poles 112 and 114 with the energized windings. Thus, the sequence continues with the phases energized and de-energized in a clockwise pattern causing the rotor 102 to rotate in a counterclockwise direction. The controller is also capable of energizing the phases in an opposite pattern of rotation causing the rotor 102 to rotate clockwise.

The phase controller 84 permits control of speed, rotational direction and thrust of the switched reluctance motor. In general, such control results from appropriate timing and sequence of multiple phase energizations. The controller also regulates the level of current applied to each phase. The control may be based upon position feedback to provide an accurate representation of the rotor angular position, such as via a position sensor or other monitoring device (not shown). Alternatively, the phase controller 84 may implement a position calculating function or algorithm which continuously tracks the rotor position.

As will occur to those skilled in the art, operation of the switched reluctance motor will depend upon the geometrical configuration of the stator and rotor, as well as the timing and sequence of phase energization, to achieve proper performance. However, the drawings and discussion above are not to be read as limiting. There are numerous configurations which could be implemented, such as changing the number of windings in the stator and/or the number of poles on the rotor. Indeed, depending on the physical relationship between the windings and the poles, it is possible that the phase energization sequence would not be a simple pattern of a first phase followed by an adjacent phase.

Switched reluctance motors have not been employed in trolling motors or electric outboards in the prior art. It has been found that, despite conventional teachings, switched reluctance motors can effectively provide extremely high performance in relatively small and efficient packages for such applications. Indeed, the present invention provides power ratings in terms of actual thrust delivered to the propulsion unit props which are higher than conventional systems when considering the size and weight of the driving motors. Moreover, the application of control or drive signals to the windings of the switch reluctance motor, which are provided outside and concentric to the rotor, allows for heat generated during operation to be dissipated directly through the motor housing or shell.

The switched reluctance motors used in the embodiments herein may be obtained from a variety of commercial sources. For example, motors may be obtained from Semifusion Corporation of Morgan Hill, Calif. that provide excellent performance in the propulsion unit packages. Moreover, control circuitry for the propulsion control unit 72, will generally includes a microprocessor, associated memory, and communications components. The microprocessor is programmed to implement the propulsion unit drive technique described herein without undue experimentation. The switched reluctance controller 84, which receives signals from the microprocessor and translates these signals to the drive signal needed to cause controlled rotation of the switched reluctance motors, may be obtained commercially from Semifusion Corporation of Morgan Hill, Calif.

Keeping in mind the operation of the motor as described in FIG. 6, and now referring to FIG. 5, the operation of an alternative embodiment is described. FIG. 5 is a diagrammatical representation for the operation of the secondary propulsion system depicted in FIG. 2. An operator input device 70 is shown to be connected to a propulsion control unit 72. The operator input device 70 is depicted as a foot pedal which allows for numerous commands to be indicated by the operator as described above.

The propulsion control unit 72 receives signals from the operator input device 70 and processes the command or request accordingly. The propulsion control unit 72 will then transmit a command or signal to the switched reluctance controllers 84 and 128. The controllers 84 and 128 operate, as discussed above, to control the timing and sequence of phase energization, as well as to determine the level of current to be supplied to the motors 64 and 56 respectively.

Because the embodiment of FIG. 5 achieves directional control through relative control of the switched reluctance motors, rather than through angular positioning of the propulsion unit, control unit 72 is adapted to cause differential driving of motors 56 and 64 through the intermediary of controllers 128 and 84, respectively. For example, if the signal received by the propulsion control unit 72 is a directional signal, i.e. turn left or turn right, then the propulsion control unit 72 may transmit a signal to the first switched reluctance controller 84 to operate the motor 64 at a first speed, and transmit a signal to the second switched reluctance controller 128 to operate the corresponding motor 56 at a second speed. The speed differential between the two motors 56 and 64 would the create an imbalance of thrust on the watercraft causing it to turn in the desired direction. Alternatively, the propulsion control unit 72 could transmit a signal to the first controller 84 to operate the motor 64 at a specified speed in a first direction of rotation. The propulsion control unit 72 would transmit a signal to the second controller 128 to operate the associated motor 56 at a specified speed but in a second direction of rotation opposite that of the first motor 64. The watercraft would then experience a moment about a defined axis of rotation causing it to turn the desired direction.

If the operator generates an input command for thrust in a given direction (i.e., forward or reverse), the propulsion control unit 72 would process this command and transmit appropriate instruction to each of the controllers 84 and 128. In this case, each of the motors would be given similar instructions to operate at the same speed and in the same direction of rotation. A wide variety of combinations in speeds and directions are thus available to provide navigation through control of the switched reluctance motors.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A propulsion unit for a surface watercraft comprising:
    a prop adapted for producing thrust when rotated during operation;
    a switched reluctance electric motor drivingly coupled to the prop to rotate the prop at a desired speed and direction to produce the thrust, the switched reluctance electric motor comprising a rotor and a stator having a plurality of phases;
    a control unit adapted to sequentially energize the plurality of phases to induce rotation of the rotor; and
    wherein the propulsion unit is fixedly mounted directly to a hull of the watercraft.

2. The propulsion unit of claim 1, wherein the stator is formed of a plurality of windings and the rotor comprises a plurality of poles about an outer periphery of the rotor.

3. The propulsion unit of claim 2 wherein the windings are divided into a plurality of phases and wherein current is applied to a phase and wherein a magnetic flux field is created within the motor by the application of current to the phase.

4. The propulsion unit of claim 3, wherein electrical current is applied sequentially to one phase at a time and wherein the order to which phase the electrical current will be applied is predetermined.

5. The propulsion unit of claim 3, wherein the current is applied to the phases such that the phases are energized in a pattern representing a first rotational direction.

6. The propulsion unit of claim 5, wherein the rotor is adapted to rotate in a second rotational direction opposite the first rotational direction.

7. The propulsion unit of claim 1, wherein the motor is bi-directional.

8. The propulsion unit of claim 1, wherein the motor further comprises a thermally dissipative housing adjacent the stator and wherein the stator and rotor are contained within the housing.

9. The propulsion unit of claim 8, wherein substantially all heat generation occurs in the windings of the stator.

10. The propulsion unit of claim 1 wherein the propulsion unit is a trolling motor for a watercraft.

11. The propulsion unit of claim 1, wherein the motor is mounted in an interior section of the hull and the prop is mounted on an exterior section of the hull.

12. The propulsion unit of claim 11, further comprising a flexible shaft coupled between the motor and the prop.

13. The propulsion system of claim 1, wherein the motor and the prop are both mounted on an exterior section of the hull.

14. The propulsion unit as recited in claim 1, further comprising a foot-operated input device to direct the energizing of the switched reluctance electric motor to produce the desired speed and direction of rotation of the prop.

15. A method of propulsion for a surface watercraft comprising the acts of:
    (a) providing a prop adapted for displacing water upon rotation of the prop;
    (b) drivingly coupling the prop to a switched reluctance electric motor having a stator having a plurality of phases, and a rotor having a plurality of poles;
    (c) successively energizing the phases of the stator to create magnetic flux fields to drive the rotor in rotation and thereby to produce thrust from the prop;
    (d) using a controller to direct the energizing of the phases of the stator to produce a desired speed and direction of rotation; and
    (e) fixedly coupling the electric motor directly to the watercraft.

16. The method of claim 15, further comprising the acts of energizing all phases of stator in a sequential pattern exhibiting a first rotational direction as commanded via an operator input.

17. The method of claim 16, further comprising the act of reversing the sequential energization of the phases such that the rotor is displaced in a second rotational direction opposite the first rotational direction.

18. The method of claim 15, comprising the further acts of coupling the stator to a controller coupled to an operator input device, and directing the sequential pattern of energization via the controller.

19. The method of claim 15, comprising the further acts placing the electric motor on an interior portion of a watercraft hull and placing the prop on an exterior portion of the watercraft hull.

20. The method of claim 15, comprising the further act of fixedly coupling the electric motor directly to the watercraft.

21. The method as recited in claim 15, further comprising the act of using a foot-operated input device to direct the energizing of the switched reluctance electric motor to produce the desired speed and direction of rotation of the prop.

22. A secondary propulsion unit for a surface watercraft comprising:

a housing adapted to be submerged underwater;

a prop rotatable to provide thrust;

a switched reluctance electric motor housed within the housing, the switched reluctance electric motor comprising a stator having a plurality of phases and a rotor drivingly coupled to the prop;

a control unit adapted to sequentially energize the plurality of phases to induce rotation of the rotor; and a foot-operated input device to direct the control unit to energize the plurality of phases to produce a desired rotation of the prop.

23. A method of propulsion for a surface watercraft comprising the acts of:

(a) providing a prop adapted for displacing water upon rotation of the prop;

(b) drivingly coupling the prop to a switched reluctance electric motor having a stator having a plurality of phases, and a rotor having a plurality of poles;

(c) successively energizing the phases of the stator to create magnetic flux fields to drive the rotor in rotation and thereby to produce thrust from the prop;

(d) using a controller to direct the energizing of the phases of the stator to produce a desired speed and direction of rotation; and (e) placing the electric motor on an interior portion of a watercraft hull and placing the prop on an exterior portion of the watercraft hull.

24. A method of propulsion for a surface watercraft comprising the acts of:

(a) providing a prop adapted for displacing water upon rotation of the prop;

(b) drivingly coupling the prop to a switched reluctance electric motor having a stator having a plurality of phases, and a rotor having a plurality of poles;

(c) successively energizing the phases of the stator to create magnetic flux fields to drive the rotor in rotation and thereby to produce thrust from the prop;

(d) using a controller to direct the energizing of the phases of the stator to produce a desired speed and direction of rotation; and (e) placing both the electric motor and the prop on an exterior portion of a watercraft hull.

* * * * *

UNITED STATES PATENT AND TRADEMARK OFFICE
CERTIFICATE OF CORRECTION

PATENT NO.    : 6,638,122 B1
DATED         : October 28, 2003
INVENTOR(S)   : Thomas E. Griffith, Sr.

It is certified that error appears in the above-identified patent and that said Letters Patent is hereby corrected as shown below:

<u>Column 9,</u>
Line 14, delete "fixedly coupling the electric motor directly to the watercraft" and susbstitute therefor -- placing both the electric motor and the prop on an exterior portion of a watercraft hull --

Signed and Sealed this

Ninth Day of March, 2004

JON W. DUDAS
*Acting Director of the United States Patent and Trademark Office*